(12) United States Patent
Knudsen et al.

(10) Patent No.: US 10,443,601 B2
(45) Date of Patent: Oct. 15, 2019

(54) PUMP UNIT HAVING AN ELCTRIC DRIVE MOTOR AND ELECTRONIC CONTROL DEVICE

(75) Inventors: Ivan Knudsen, Rodekaersbro (DK); Torben Thorsager Dissing, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 1787 days.

(21) Appl. No.: 12/528,169

(22) PCT Filed: Feb. 20, 2008

(86) PCT No.: PCT/EP2008/001321
§ 371 (c)(1),
(2), (4) Date: Aug. 21, 2009

(87) PCT Pub. No.: WO2008/101687
PCT Pub. Date: Aug. 28, 2008

(65) Prior Publication Data
US 2010/0316503 A1    Dec. 16, 2010

(30) Foreign Application Priority Data
Feb. 21, 2007 (DK) ................................ 2007 00276

(51) Int. Cl.
*F04D 15/00* (2006.01)
*G01P 13/04* (2006.01)
*H02P 6/30* (2016.01)

(52) U.S. Cl.
CPC ..... *F04D 15/0094* (2013.01); *F04D 15/0088* (2013.01); *G01P 13/04* (2013.01); *H02P 6/30* (2016.02)

(58) Field of Classification Search
CPC ........ F04B 49/022; F04B 49/06; F04B 49/08; F04B 49/20; F04B 2203/02;
(Continued)

(56) References Cited

U.S. PATENT DOCUMENTS 3,431,858 A    3/1969 Lynn, Sr. et al.
3,970,413 A *  7/1976 Duveau ............................ 417/7
(Continued)

FOREIGN PATENT DOCUMENTS

EP    1 201 932 A2    5/2002
EP    1 495 773 A2    1/2005
(Continued)

OTHER PUBLICATIONS

Waukesha Cherry-Burrell, Oct. 2009, website http://williamscarver.com/wp-content/uploads/2014/09/Waukesha-C-Series-Centrifugal-Pump2.pdf "Waukesha Cherry-Burrell Instruction Manual Centrifugal Pumps", p. 15 and 42.*

*Primary Examiner* — Bryan M Lettman
*Assistant Examiner* — Charles W Nichols
(74) *Attorney, Agent, or Firm* — Panitch Schwarze Belisario & Nadel LLP

(57) ABSTRACT

The invention relates to a pump assembly with a pump and with an electrical drive motor, as well as an electronic control device. The electronic control device includes a rotation direction recognition module for recognizing the correct rotation direction (CW, CCW) of the drive motor and of the pump. The rotation direction recognition module detects at least one performance characteristic value (H, Q, P) of the pump assembly, and is designed in a manner such that on rotation of the drive motor, the rotation direction recognition module detects at least one performance characteristic value (H, Q, P) and determines the correct rotation direction (CW, CCW) by way of evaluation of the performance characteristic value (H, Q, P).

11 Claims, 5 Drawing Sheets

(58) Field of Classification Search
CPC ...... F04B 2203/0208; F04B 2203/0209; F04B 2205/01–05; F04B 2205/06; F04B 2205/07; F04B 2205/09; F04D 15/0094; F04D 15/0088; H02P 6/30; G01P 13/04
USPC .... 417/45, 44.1, 44.2, 17, 18, 20, 43, 44.11, 417/63, 423.11
See application file for complete search history.

(56) References Cited

U.S. PATENT DOCUMENTS

| | | | | |
|---|---|---|---|---|
| 4,942,346 | A * | 7/1990 | Ardit et al. | 318/280 |
| 5,542,307 | A * | 8/1996 | Hasegawa et al. | 74/15.63 |
| 5,649,808 | A * | 7/1997 | Gruszecki et al. | 417/63 |
| 5,777,217 | A * | 7/1998 | Misato et al. | 73/114.81 |
| 5,973,465 | A * | 10/1999 | Rayner | 318/459 |
| 6,066,932 | A * | 5/2000 | Fetzer | 318/445 |
| 6,481,973 | B1 * | 11/2002 | Struthers | 417/36 |
| 6,663,349 | B1 * | 12/2003 | Discenzo et al. | 417/44.1 |
| 6,900,603 | B1 * | 5/2005 | Del Vecchio | 318/16 |
| 7,847,498 | B2 * | 12/2010 | Shibuya | 318/400.01 |
| 8,287,246 | B2 * | 10/2012 | Plitt et al. | 417/44.11 |
| 2005/0123408 | A1 * | 6/2005 | Koehl | 417/53 |
| 2005/0158183 | A1 * | 7/2005 | Marioni | 417/315 |
| 2006/0038529 | A1 * | 2/2006 | Park | 318/798 |
| 2006/0117542 | A1 * | 6/2006 | Katsibardis et al. | 29/407.05 |
| 2006/0198735 | A1 * | 9/2006 | Iijima et al. | 417/44.1 |
| 2008/0110009 | A1 * | 5/2008 | Katsibardis et al. | 29/421.1 |
| 2011/0033314 | A1 * | 2/2011 | Plitt et al. | 417/15 |
| 2011/0051297 | A1 * | 3/2011 | Knox et al. | 361/23 |
| 2011/0204631 | A1 * | 8/2011 | Minami et al. | 290/44 |

FOREIGN PATENT DOCUMENTS

| | | |
|---|---|---|
| FR | 2 655 599 A1 | 6/1991 |
| GB | 324 156 A | 1/1930 |
| GB | 324156 * | 1/1930 |

* cited by examiner a)

b)

c)

PUMP UNIT HAVING AN ELCTRIC DRIVE MOTOR AND ELECTRONIC CONTROL DEVICE

CROSS-REFERENCE TO RELATED APPLICATIONS

This application is a Section 371 of International Application No. PCT/EP2008/001321, filed Feb. 20, 2008, which was published in the German language on Aug. 28, 2008, under International Publication No. WO 2008/101687 A2 and the disclosure of which is incorporated herein by reference in its entirety.

BACKGROUND OF THE INVENTION

The invention relates to a pump assembly with a pump and an electric drive motor, as well as to an electric control device.

Such pump assemblies are applied for the most varied of purposes, for example as submersible pumps for the delivery of water. In particular, with the design as centrifugal pumps, it is important for the rotor or the impeller of the pump to rotate in a defined rotation direction. If the pump impeller rotates in the opposite rotation direction, then the pump has a worsened efficiency. For this reason, on starting operation of the pump, it is important to ensure the correct rotation direction. The rotation direction of the drive motor as a rule however, depends on the electric connection. This means that the phases must be correctly connected, in order to achieve the correct rotation direction of the drive motor for the correct rotation direction of the pump impeller or pump impellers. For this reason, on starting operation of such pump assemblies, it is always necessary to check the correct rotation direction and, as the case may be, to change the electrical connection by way of exchanging the phases, such that the correct rotation direction is set. This renders the starting operation of the pump assembly quite complicated. In particular, it is difficult to check the correct rotation direction, if it is the case of submersible pumps which are not visible on operation, and are not accessible.

BRIEF SUMMARY OF THE INVENTION

It is therefore the object of the invention to provide an improved pump assembly, with which one may simply ensure that the rotation direction is correct on starting operation.

This object is achieved by a pump assembly in accordance with the present invention. Preferred embodiments are to be deduced from the description as well as the attached figures.

According to the invention, the electronic control device of the pump assembly comprises a rotation direction recognition module for recognising the correct rotation direction of the drive motor and the pump. The rotation direction recognition module comprises means for detecting at least one performance characteristic value of the pump assembly, and is designed in a manner such that it detects at least one performance characteristic value on rotation of the drive motor, and determines the correct rotation direction by way of evaluating the performance characteristic value. I. e. according to the invention, the control device of the pump assembly is provided with means, in order to automatically recognise the correct rotation direction. I.e. in the ideal case, on connection, the operating personnel do not have to ascertain the rotation direction in an awkward manner, and to observe the correct connection, but rather the pump determines the correct rotation direction itself. Thereby, the pump may either automatically set the correct rotation direction, as is described in more detail hereinafter, or merely signalizes the wrong connection to the operating person, so that he may correctly set the electrical connection.

By way of the evaluation of the performance characteristic values, one may ascertain whether the pump is operated at the maximum efficiency, which is only achieved with a correct rotation direction. The correct rotation direction may thereby be determined from the performance characteristic values in different manners, for example by way of comparison with predefined comparison values, which are stored in the control device or the rotation direction recognition module, or are determined by comparison of detected performance characteristic values at different rotation directions.

The pump assembly or its electronic control device particularly preferably comprises a frequency converter for the control of the rotation speed of the drive motor. Thereby, the rotation direction recognition module may be integrated into the frequency converter or directly cooperate with this. In particular, it is possible to change the rotation direction of the drive motor by way of a suitable activation of the frequency converter. Thus, the rotation direction recognition module, via the frequency converter, may for example let the pump rotate in two rotation directions in succession, in order to detect the performance characteristic values with the two rotation directions, and to evaluate or recognise the correct rotation direction therefrom.

Further preferably, the frequency converter and the rotation direction recognition module are designed or integrated or linked with one another, in a manner such that they cooperate, so that the frequency converter sets the rotation direction of the drive motor according to the determined, correct rotation direction. I.e. after the rotation direction recognition module has determined the correct rotation direction with the defined connection, the frequency converter may be activated such that it is precisely this determined correct rotation direction with is used on operation of the pump. I.e. with the use of a frequency converter in a control device, which comprises a rotation direction recognition module according to the invention, after an effected electrical connection of the pump assembly, it is possible to automatically recognise the correct rotation direction, and to set the correct rotation direction on operation, purely by way of the control of the frequency converter, without the electrical connections having had to be changed for correcting the rotation direction.

According to a first preferred embodiment, the rotation direction recognition module is designed in a manner such that it compares the at least one detected performance characteristic value with a known, defined or definable performance characteristic value. By way of this, one may ascertain whether the nominal efficiency has been reached. If this efficiency, i.e. the defined performance characteristic value is not reached, one may then deduce from this that the wrong rotation direction is given. For this, the known performance characteristic value or nominal performance characteristic value may be stored in a memory in the control device or its rotation direction recognition module. Moreover, one may also provide input means on the control device, via which a nominal performance characteristic value may be inputted by an operating person, and/or one may select from several stored values, in order to define or set a nominal performance characteristic value or comparison performance characteristic value for a certain application situation.

The at least one performance characteristic value, which is detected by the rotation direction recognition module and is evaluated, may for example be the pressure and/or the throughput and/or the power of the drive motor. Basically, suitable sensors may be arranged in the pump assembly for detecting the performance characteristic values. For example, a pressure sensor may be provided on the exit side of the pump, in order to detect the exit pressure at the pump. Furthermore, a throughput sensor may be provided, in order to determine the throughput of the pump. If both variables are detected, one may likewise evaluate the hydraulic power from these, and for the performance characteristic value to be based on this. For this, the control device or its rotation direction recognition module may comprise a computation unit for determining the current hydraulic power from the data detected by the sensors. The power of the drive motor may be detected in different manners, for example by way of a flow sensor, or also from other current characteristic values of the motor.

The rotation direction recognition module is further preferably designed in a manner such that in each case it detects at least one performance characteristic value and recognises the correct rotation direction by way of comparison of the detected characteristic values, for recognising the correct rotation direction on rotation of the drive motor in both rotation directions. I.e. the same at least one performance characteristic value is detected with both rotation directions. Then, the rotation direction recognition module may recognise which is the correct rotation direction by way of comparing the two detected performance characteristic values. The drive motor is driven successively in both rotation directions at otherwise identical constraints, for detecting the performance characteristic values in both rotation directions. In particular, the drive is effected at the same rotational speed, so that preferably the rotation direction is changed as a single parameter.

For this, the control device is further preferably designed in a manner such that the rotation direction recognition module automatically causes the control device to rotate the drive motor in both rotation directions for the recognition of the correct rotation direction. I.e. the control device may be designed such that on starting operation of the pump assembly, firstly the rotation direction recognition module is prompted to determine the correct rotation direction or the right rotation direction. For this, the rotation direction recognition module may then prompt the control device and for example a frequency converter, to drive the drive motor successively in both rotation directions, in order to detect performance characteristic values with both rotation directions, and then to evaluate these for recognising the rotation direction. Alternatively, it is also possible for the rotation in both rotation directions to be started manually by an operating person, for example after being instructed by the control device or the rotation direction recognition module.

Thereby, it is conceivable for the rotation direction to be changed manually by way of changing the electrical connection. The instruction may be effected for example by way of display means, display lights, a display or likewise, which cooperate with the control device and the rotation direction recognition module.

Further preferably, the rotation direction recognition module comprises means for detecting at least two performance characteristic values, and is designed in a manner such that a recognition of the correct rotation direction is effected by way of the evaluation of at least two performance characteristic values. I.e. sensors for detecting at least two performance characteristic values are provided in the pump assembly, whose output signal is led to the rotation direction recognition module. The rotation direction recognition module is designed such that it takes into account the at least two detected performance characteristic values for determining the correct rotation direction, i.e. evaluates them together. It is to be understood that one may also detect more than two performance characteristic values, in order to permit a more reliable determining of the correct rotation direction. The consideration of several performance characteristic values is particularly advantageous, since on detecting the performance characteristic values, there may be regions for the individual performance characteristic values, in which an exact differentiation between the wrong and the correct rotation direction is not possible, on account of measurement errors or the measurement noise. One may achieve a greater sureness in these regions by way of taking a second performance characteristic value into account.

According to a further preferred embodiment, the rotation direction recognition module is provided with a signal device, and is designed in a manner such that in the case that the correct rotation direction may not be recognised by the rotation direction recognition module on the basis of the at least one detected performance characteristic value, this fact is signalized by way of the signal device. I.e. in regions, in which for example a precise differentiation between the wrong and correct rotation direction is not possible, for example due to the occurring measurement noise, when detecting the performance characteristic values, the rotation direction recognition module by way of the signal device, for example a display element in the form of a control light or a text output on a display of the control device, may signalize to the operating person that the recognition of the rotation direction was not possible by way of the automatic routine. The operating person then has the possibility of manually determining the correct rotation direction. For this, the rotation direction recognition module is preferably designed such that both rotation directions may be activated manually, and possibly certain performance characteristic values may be detected and displayed, which allow the operating person to make a decision as to which is the correct rotation direction. The activation in both rotation directions is in particular possible, if the rotation direction recognition module is coupled to, or cooperates with, a frequency converter for the activation of the drive motor. The frequency converter may then be activated such that both rotation directions may be activated.

According to a further preferred embodiment, the rotation direction recognition module is designed in a manner such that a detection and evaluation of the at least one performance characteristic value is possible at least two different rotational speeds of the drive motor. This permits the checking of the correct rotation direction at different rotation speeds, so that one may select that rotation speed, at which for example the most reliable recognition of the correct rotation direction is possible, for example depending on the respective application conditions. This embodiment is also preferably realised in combination with a frequency converter for activating the drive motor, since the rotational speed of the drive motor and/or the rotation direction of the drive motor may be changed by way of suitable activation via this frequency converter.

Further preferably, the rotation direction recognition module is designed in a manner such that a detection and an evaluation of the at least one performance characteristic value is firstly effected at a first rotation speed, and in the case that a recognition of the correct rotation direction is not possible at this speed, is repeated at least one second, preferably higher rotation speed. If at this second rotation speed, again no exact recognition of the correct rotation direction is possible, the rotation speed may be changed once again, preferably increased once again. This may be effected until the maximal rotation speed is reached. If no recognition of the correct rotation direction is possible until then, the operating person is notified, preferably by the rotation direction recognition module via a signal device, that the automatic recognition of the correct rotation direction is not possible. By way of changing, and particularly by way of increasing the rotational speed at the rotation direction recognition module, it is possible to leave the regions in which a reliable determining of the correct rotation direction is not possible on account of measurement errors or measurement noise, and thus to then determine the correct rotation direction. Preferably, the rotation speed change is effected via a frequency converter, which is suitably coupled to the rotation direction recognition module, so that the rotation direction recognition module may prompt the frequency converter to rotate the drive motor at a predefined rotation speed and preferably selectively in both rotation directions, in order, at these settings, to then evaluate the performance characteristic values by way of suitable sensors and to evaluate them in the rotation direction recognition module, in order to recognise the correct rotation direction.

The pump assembly is particularly preferably designed as a centrifugal pump. With such centrifugal pumps, the efficiency is greatly dependent on the rotation direction, so that it is particularly advantageous with these pumps, to ensure that the pump is operated in the correct rotation direction The rotation direction recognition module is preferably designed as a microprocessor, in which the required computations on the basis of the detected performance characteristic values are carried out for determining the rotation direction. A special microprocessor may be provided for this in the control device. Alternatively, it is also possible to let the rotation direction recognition module run as a program in a microprocessor, which is provided for yet further functions in the context of control and diagnosis of the pump assembly. For this, the sensors for detecting the performance characteristic values are connected to the microprocessor for data transmission, wherein an analog-to digital converter may be provided, in order to digitalise the output signals of the sensors.

Furthermore, the rotation direction recognition module may comprise a memory in which nominal values for the performance characteristic values are stored. The rotation direction recognition module may then have a comparison, which compares the currently evaluated performance characteristic values with the previously stored performance characteristic values, in order to determine the correct rotation direction. In particular, this design may be applied if the nominal performance characteristic values for the correct rotation direction at the selected application conditions are known beforehand, and thus a comparison with such predefined performance characteristic values is possible. In the case that such nominal-performance characteristic values are not known, for example because the surrounding conditions, in which the pump assembly is applied, are not known beforehand, the rotation direction recognition module is preferably designed such that performance characteristic values are detected at both rotation directions and are compared to one another. It is also possible to design the rotation direction recognition module such that both methods may be realised, on the one hand the comparison with predefined performance characteristic values, or the comparison of two performance characteristic values or of several performance characteristic values with different rotation directions. For this, the rotation direction recognition module may be provided with selection means, via which an operating person may select which of the methods may be applied. Moreover, the rotation direction recognition module may also be designed such that it automatically recognises which method must be applied, for example if, given a comparison with a predefined performance characteristic value, such a predefined performance characteristic value is not reached with any rotation direction.

With the application of a frequency converter, by way of the rotation direction recognition module in cooperation with the frequency converter, it is also possible to operate the pump assembly such that predefined performance characteristic values are reached, for example pressure or throughput, and then the current frequency is determined at these predefined performance characteristic values, and one evaluates which is the correct rotation direction by way of comparing the frequencies at different rotation directions. I.e. the rotation direction recognition module may be designed in a manner such that a first performance characteristic value as a predefined performance characteristic value is currently set by way of activation of the pump assembly, and then simultaneously a second performance characteristic value, for example the output frequency of the frequency converter is detected, and an evaluation for recognition of the rotation direction is carried out on the basis of this second performance characteristic value.

The invention is hereinafter described by way of example and by way of the attached figures.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the Drawings.

DETAILED DESCRIPTION OF THE INVENTION

Figure 1:
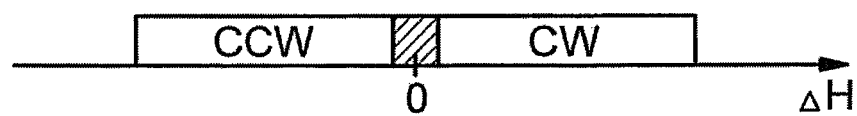
FIGS. 1a, 1b, and 1c schematically represent the differentiation of the correct rotation direction by way of three differently detected performance characteristic values.
Figure 1:
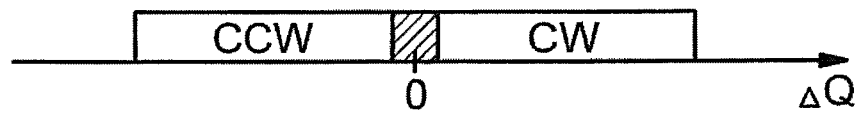
Figure 1:
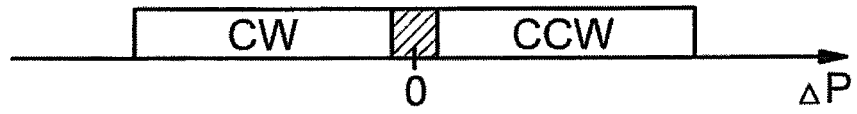

FIG. 1a shows a rotation direction recognition by way of the pressure H, i.e. of the pressure at the exit side of the pump. FIG. 1b shows the rotation direction recognition by way of the throughput Q through the pump, and FIG. 1c shows the rotation direction recognition by way of the power P, i.e. the electrical power of the drive motor.

For determining the correct rotation direction, the pump assembly is driven in both possible rotation directions, and at least one performance characteristic value, specifically for example the pressure H, the throughput Q or the power P, is detected with each rotation direction by a rotation direction recognition module. Subsequently, the difference between the performance characteristic values determined with both rotation directions is formed. I.e. in the case of FIG. 1a, the pressure difference ΔP between the pressure $P_{CW}$ in the first rotation direction, and the pressure $P_{CCW}$ in the second rotation direction is formed. Accordingly, for the embodiment according to FIG. 1b, the difference ΔQ between the throughputs $Q_{CW}$ and $Q_{CCW}$ of the two rotation directions and according to FIG. 1c the difference ΔP of the powers $P_{CW}$ and $P_{CCW}$ are determined. Thus the following formulae arise:

$$\Delta P = P_{CW} - P_{CCW}$$

$$\Delta H = H_{CW} - H_{CCW} \text{ and}$$

$$\Delta Q = Q_{CW} - Q_{CCW}$$

A region surrounding the origin is represented in a hatched manner in FIG. 1a-c. This characterises the region in which a reliable recognition of the correct rotation direction is not possible on account of too small differences between the performance characteristic values detected with both rotation directions. If the result ΔH, ΔQ and ΔP lies in this region, then further evaluations, in particular possible manual evaluations are required, in order to determine the correct rotation direction.

If the difference is larger, i.e. lies outside this hatched region, then an unambiguous evaluation of the correct rotation direction is possible. Thus, it is to be recognised that in the case that the value ΔH is larger than zero, the first rotation direction CW is correct, and the case that the pressure difference ΔH is smaller than zero, the second rotation direction CCW is the correct rotation direction. This results due to the fact that the exit pressure of the pump is greater with the correct rotation direction. Accordingly, in the case that the difference ΔQ of the throughputs according to the above formula is positive, then the rotation direction CW is correct, and in the case that this difference ΔQ is negative, then the second rotation direction CCW is correct. This results due to the fact that a greater throughput is given with a correct rotation direction of the pump. In the case that the power P as a performance characteristic value is compared, then in the case that the power difference ΔP according to the above formulae is larger than zero, then the second rotation direction CCW is correct, and in the case that the difference ΔP is smaller than zero, the first rotation direction CW is then correct. This is due to the fact that the electrical power uptake is smaller with the correct rotation direction than with the incorrect rotation direction. When rotating in the correct rotation direction, the pump has a greater efficiency and thus a lower power uptake.

It is to be understood that other performance characteristic values may also be employed. In particular also the hydraulic power $$P_{hyd} = H \cdot Q.$$

Then accordingly, the difference $$\Delta P_{hyd} = H_{CW} Q_{CW} - H_{CCW} Q_{CCW}$$

may be formed, and one may recognise the correct rotation direction from whether this difference is positive or negative. The rotation direction at which the hydraulic power $\Delta P_{hyd}$ is greater, is the correct rotation direction.

Figure 2:
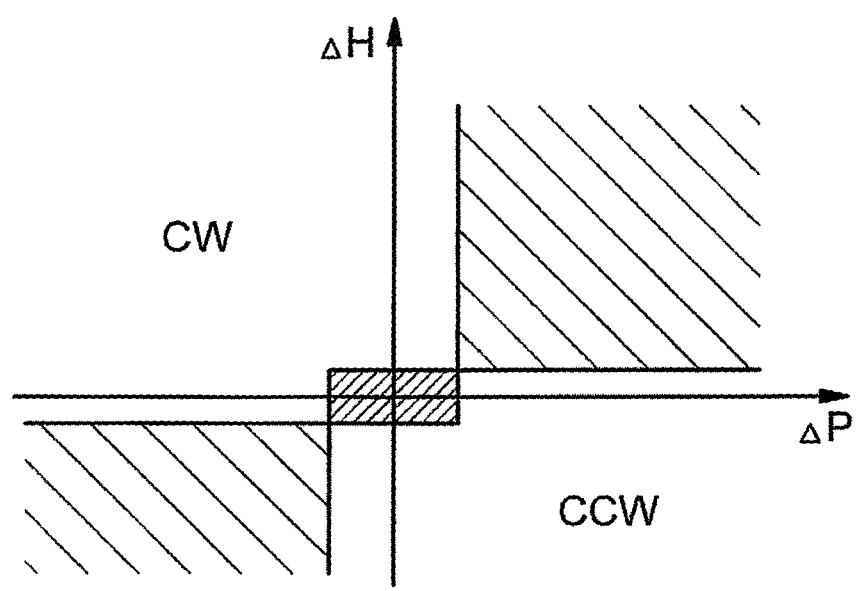
FIG. 2 schematically represents how the correct rotation direction may be recognized by way of two evaluated performance characteristic values.

By way of FIG. 2, the recognition of the correct rotation direction is explained by way of two detected performance characteristic values. According to FIG. 2, the rotation direction recognition is effected for example by way of the pressure H and the electrical power P of the pump assembly. As described above, the difference of the pressures with both rotation directions ΔH and the difference of the powers ΔP with both rotation directions is computed according to the above formula. If then this difference ΔH is positive and simultaneously the difference ΔP is negative, then the first rotation direction CW is correct. If the power difference ΔP is positive and the pressure difference ΔH is negative, then the second rotation direction CCW is correct, wherein the difference formation was effected according to the formulae cited above with this evaluation. As is indicated in FIG. 2, the evaluation regions which are characterised at CW and CCW in FIG. 2, extend beyond the zero axis. Thus the region, in which a reliable automatic recognition of the correct rotation direction is possible, is increased. The regions in which a recognition on account of measurement errors or measurement noise is not possible, is reduced in size. These regions are likewise represented hatched in FIG. 2. One may recognise that the tightly hatched region 2 is reduced in size in the environment of the origin. I.e. a rotation direction recognition may also take place if the pressure difference ΔH is close to the origin, provided that the power difference ΔP does not simultaneously lie in this region. Vice versa, a rotation direction recognition is also possible if the power difference ΔP in the region 2 lies close to the origin, if simultaneously the pressure difference ΔH lies outside this region.

Figure 3:
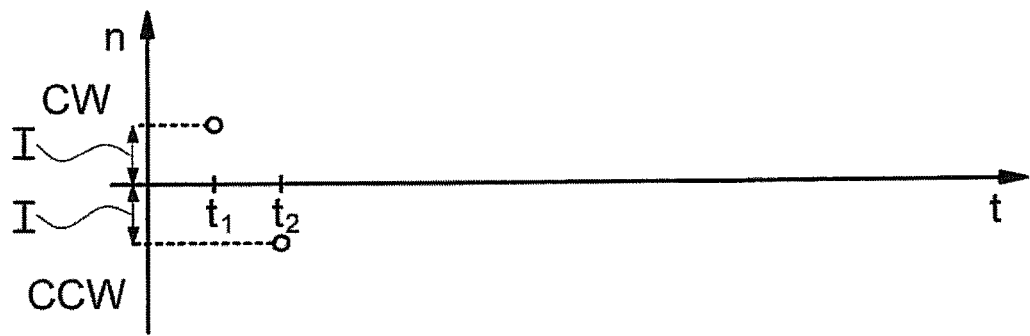
FIGS. 3a, 3b, and 3c show steps in the course of the rotation direction recognition at different rotation speeds.
Figure 3:
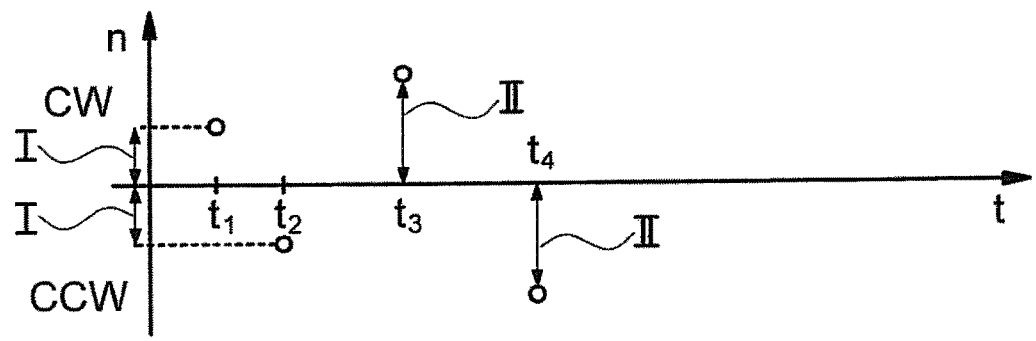
Figure 3:
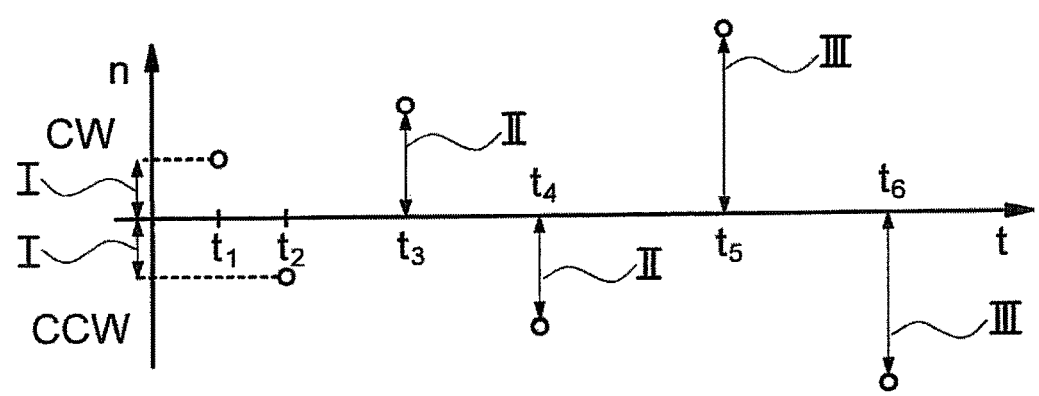

A further possibility for increasing the reliability of the rotation direction recognition is possible by way of changing the rotation speed. This is represented in the FIGS. 3a-3c. FIGS. 3a-3c show diagrams in which the rotation speed n is represented against time t. In FIG. 3a, it is shown that firstly measurements of the performance characteristic values are carried out at a first rotation speed I. For this, the drive motor at the point in time t1 is driven at the rotation speed I firstly in the first rotation direction CW, and subsequently with the same rotation speed I at the point in time t2 in the second rotation direction CCW. Simultaneously, at the points in time t1 and t2, the respective performance characteristic values are determined, and are then subtracted from one another according to the preceding description, in order to recognise the correct rotation direction. If the correct rotation direction is not recognisable at the first rotation speed I, for example because the formed differences lie in the region of the measurement inaccuracy, i.e. the hatched regions in the diagrams according to FIGS. 1 and 2, the measurement, as is shown in FIG. 3b, is repeated at a further rotation speed II at the points in time t3 and t4. The performance characteristic values are then again detected also at these points and the differences accordingly formed. If no recognition of the rotation direction is possible at the rotation speed II, then the measurement, as shown in FIG. 3, may be repeated at a third rotation speed III at the points in time t5 and t6. It is to be understood that one may yet provide further increases in the rotation speed until the maximal rotation speed of the pump assembly is reached. A manual determining would have to be carried out should an evaluation of the correct rotation speed still not be possible then. This may be made aware to the operating person by way of a signal device for example.

Figure 4:
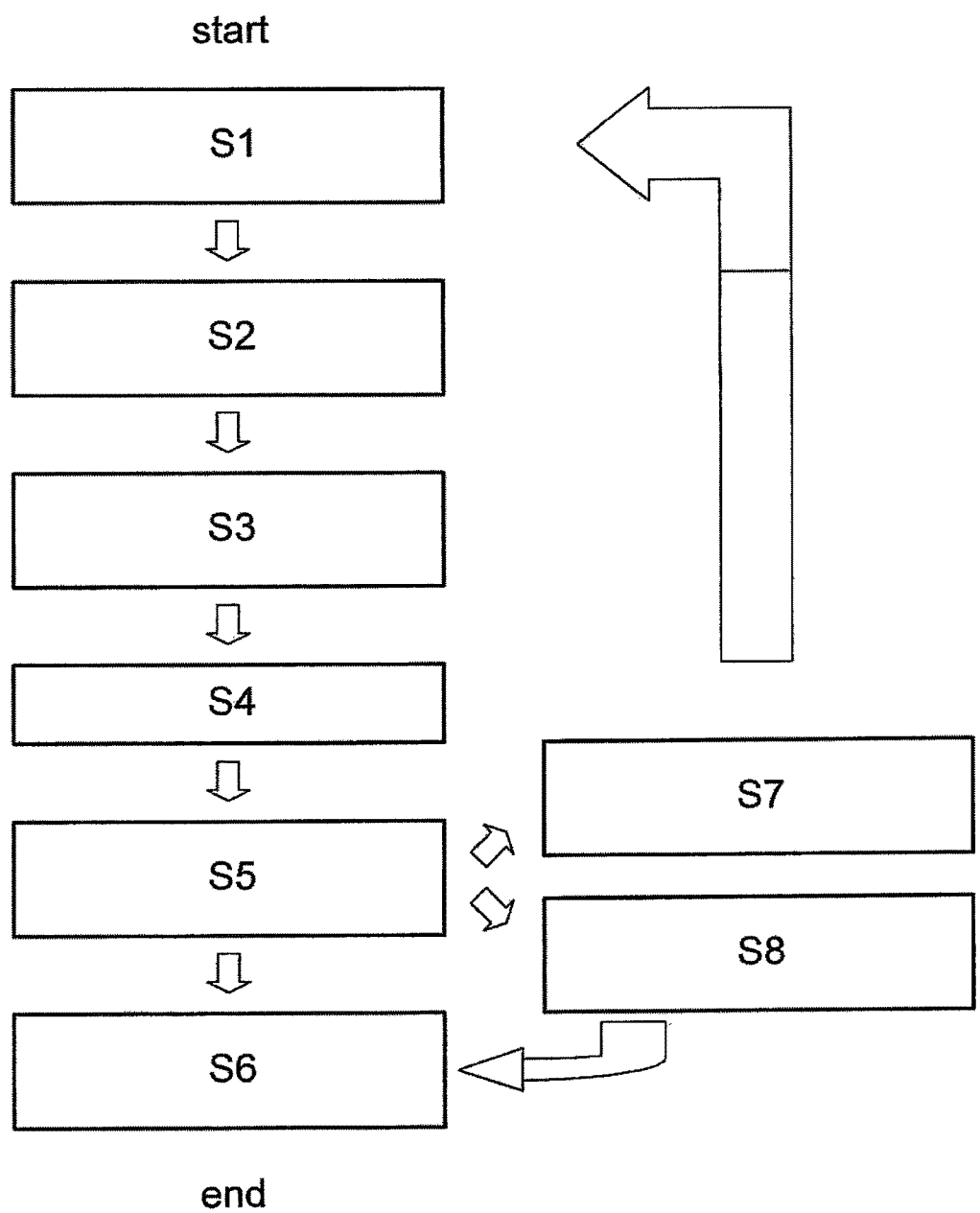
FIG. 4 is a sequence diagram showing a preferred sequence of the rotation speed recognition.

The procedure of the rotation direction recognition is described schematically by way of FIG. 4. In the step S1, firstly the pump assembly is operated at a first rotation speed I in a first rotation direction CW. At this rotation speed, one or more performance characteristic values are detected by the rotation direction recognition module. These may be the pressure H, the throughput Q and/or the power P for example. Subsequently, in step S2, the pump assembly is stopped, and then in step S3 is driven at the same rotation speed I, but in the opposite rotation direction CCW. The same performance characteristic values as in step S1 are detected with this rotation direction. Then in step S4, the difference between the performance characteristic values computed in step S1 and in step S3 is formed. In step 5, one then examines as to whether the difference is adequately large, in order to determine the correct rotation direction, i.e. the difference lies outside the region of the measurement inaccuracies, the hatched regions in FIGS. 1 and 2. If the difference is large enough, the correct rotation direction is determined and the rotation direction of the pump assembly is set accordingly in step S6. This may be effected either by way of a suitable activation of a frequency converter, or by way of changing the poling of the electrical connections, wherein this too may be effected automatically by switches, in particular electronic switches in the pump assembly. Alternatively, an operating person may also be signalized by a signal device, that the electrical connections need to be changed manually, in order to set the correct rotation speed.

If in step S5, it is ascertained that the evaluated difference between the performance characteristic values is smaller than the minimal difference for determining the correct rotation direction, then either according to step S7, a new sequence of the measurement routine beginning with S1 at a higher rotation speed II may be effected, or a manual test of the correct rotation speed is prompted in step S8, in particular if previously the evaluation has already been effected at the maximal possible rotation speed.

Figure 5:
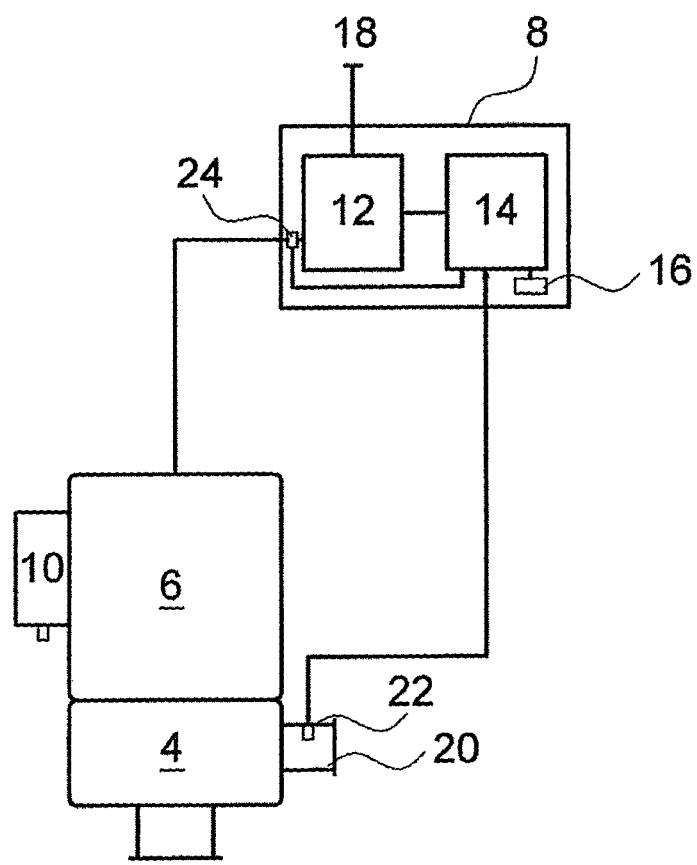
FIG. 5 is a schematic diagram of a pump assembly according to the invention.

FIG. 5 schematically shows the construction of the pump assembly according to the invention. The pump assembly consists of a pump 4 and an electrical drive motor 6. Moreover, a control device 8 is present for activating the pump assembly and in particular the drive motor 6. The control device 8 is shown schematically and enlarged in FIG. 5. It is to be understood that the control device 8 is usefully integrated into a terminal box 10 of the pump assembly. The control device 8 comprises a frequency converter 12 and a rotation direction recognition module 14. Moreover, a display device 16 in the form of one or more signal lights or a display is provided. The control device 8 is supplied with mains voltage via an electrical connection 18. The mains voltage is changed in its frequency via the frequency converter 12, such that the drive motor 6 may be driven by the frequency converter 12 in the desired rotation speed and rotation direction.

Moreover, a sensor 22 for detecting the pressure and/or the throughput of the pump 4 is arranged at the exit side or pressure side of the pump 4. The output signals or output values of the sensor 22 are led to the rotation direction recognition module 14, for example via a signal lead.

Moreover, a sensor 24 for determining the electrical power which is supplied to the drive motor 6, may be provided, wherein the output signal of the sensor 24 may also be led to the rotation direction recognition module 14. It is to be understood that all these sensors or only a few of these sensors, for example the pressure sensor, the throughput sensor and/or the power sensor may be provided, and connected to the rotation direction recognition module 14. As is described above, in principle it is sufficient to determine one performance characteristic value for detecting the rotation direction.

The rotation direction recognition module 14 cooperates with the frequency converter 12 in a manner such that it instructs the frequency converter 12 with regard to the correct rotation direction, and ensures that the frequency converter 12, on operation, drives the pump assembly or the drive motor 6 in the correct rotation direction. Moreover, the rotation direction recognition module 14 may activate the frequency converter 12 during the rotation direction recognition, in a manner such that as previously described, it successively drives the drive motor 6 at a predefined rotation speed in two different rotation directions, wherein then the performance characteristic values are detected via the sensors 22, 24.

In the case that the recognition of the correct rotation direction should not be possible, the rotation direction recognition module 14 may notify an operating person of this via the signal device 16. Instructions or steps to carry out a manual determining of the rotation direction may furthermore be given to the operating person via the signal device or the display device 16. The display device 16 may be designed as a separate display device for the rotation direction recognition module 14, or be a display device, such as a display for example, via which other functions of the pump assembly may also be displayed at the control device.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A pump assembly comprising:
a centrifugal pump;
an electrical drive motor;
an electronic control device, wherein the electronic control device comprises a rotation direction recognition module for recognizing whether the correct rotation direction of the drive motor and of the centrifugal pump is clockwise (CW) or counter-clockwise (CCW), said rotation direction recognition module configured to detect at least one performance characteristic value selected from the group consisting of pressure at an exit side of the centrifugal pump (H), throughput (Q) and power (P) of the pump assembly in a manner such that on rotation of the drive motor, the rotation direction recognition module detects the at least one performance characteristic value (H, Q, P) and determines the correct rotation direction (CW, CCW) by comparing the at least one detected performance characteristic value (H, Q, P) with a corresponding known predefined performance characteristic value selected from the group consisting of a known predefined pressure at the exit side of the pump, a known predefined throughput, and a known predefined power of the pump assembly; and
one of (i) a sensor for detecting the pressure (H) and/or throughput (Q) of the pump assembly arranged at an exit side of the centrifugal pump or, (ii) a sensor for determining the power (P) supplied to the drive motor.

2. The pump assembly according to claim 1, further comprising a frequency converter for the control of the rotation speed of the drive motor.

3. The pump assembly according to claim 2, wherein the frequency converter and the rotation direction recognition module cooperate in a manner such that the frequency converter sets the rotation direction (CW, CCW) of the drive motor according to the determined, correct rotation direction.

4. The pump assembly according to claim 1, wherein the pressure (H) and/or the throughput (Q) of the centrifugal pump and/or the power (P) of the drive motor is detected as the performance characteristic value.

5. The pump assembly according to claim 1, wherein the rotation direction recognition module is provided with a signal device and is designed in a manner such that in the case that the correct rotation direction (CW, CCW) is not recognized by the rotation direction recognition module on the basis of the at least one detected performance characteristic value (H, Q, P), this is indicated with the signal device.

6. The pump assembly according to claim 1, wherein the rotation direction recognition module is designed in a manner such that a detection and evaluation of the at least one performance characteristic value (H, Q, P) is possible for at least two different rotation speeds (I, II) of the drive motor.

7. A pump assembly comprising:
a centrifugal pump;
an electrical drive motor; and
an electronic control device, wherein the electronic control device comprises a rotation direction recognition module for recognizing whether the correct rotation direction of the drive motor and of the centrifugal pump is clockwise (CW) or counter-clockwise (CCW), said rotation direction recognition module configured to detect at least one performance characteristic value selected from the group consisting of pressure (H), throughput (Q) and power (P) of the pump assembly in a manner such that on rotation of the drive motor, the rotation direction recognition module detects the at least one performance characteristic value (H, Q, P) and determines the correct rotation direction (CW, CCW) by way of evaluation of the performance characteristic value (H, Q, P), wherein the rotation direction recognition module is designed in a manner such that for recognizing the correct rotation direction (CW, CCW), the rotation direction recognition module detects in each case at least one performance characteristic value (H, Q, P) on rotation of the drive motor in both directions (CW, CCW), and recognizes the correct rotation direction (CW, CCW) by way of comparison of the detected performance characteristic values (H, Q, P).

8. The pump assembly according to claim 7, wherein the control device is designed in a manner such that the rotation direction recognition module, for recognizing the correct rotation direction (CW, CCW), automatically prompts the control device to rotate the drive motor in both rotation directions (CW, CCW).

9. The pump assembly according to claim 7, wherein the rotation direction recognition module comprises means for detecting at least two performance characteristic values (H, Q, P), and is designed in a manner such that a recognition of the correct rotation direction (CW, CCW) is effected by way of evaluation of the at least two performance characteristic values (H, Q, P).

10. The pump assembly according to claim 6, wherein the rotation direction recognition module is designed in a manner such that a detection and evaluation of the at least one performance characteristic value (H, Q, P) is first effected at a first rotation speed (I), and in the case that a recognition of the correct rotation speed (CW, CCW) is not possible, is repeated at at least one second rotation speed (II).

11. The pump assembly according to claim 10, wherein the second rotation speed (II) is higher than the first rotation speed (I).

* * * * *